United States Patent
Pettersen et al.

(10) Patent No.: US 10,024,135 B2
(45) Date of Patent: Jul. 17, 2018

(54) ELECTRICALLY ACTIVATED ADHESIVE FOR STRENGTHENING OF A SUBTERRANEAN WELLBORE

(71) Applicant: SCHLUMBERGER NORGE AS, Sandnes (NO)

(72) Inventors: Beathe Mariero Pettersen, Sandnes (NO); Anders Grinrod, Sandnes (NO); Anne Myrvold Fosse, Sandnes (NO)

(73) Assignee: SCHLUMBERGER NORGE AS, Stavanger (NO)

( * ) Notice: Subject to any disclaimer, the term of this patent is extended or adjusted under 35 U.S.C. 154(b) by 0 days.

(21) Appl. No.: 15/349,621

(22) Filed: Nov. 11, 2016

(65) Prior Publication Data

US 2017/0137693 A1 May 18, 2017

Related U.S. Application Data

(60) Provisional application No. 62/255,001, filed on Nov. 13, 2015.

(51) Int. Cl.

| | |
|---|---|
| E21B 33/138 | (2006.01) |
| E21B 21/00 | (2006.01) |
| C09K 8/44 | (2006.01) |
| C09K 8/502 | (2006.01) |
| C09K 8/508 | (2006.01) |
| C08G 83/00 | (2006.01) |
| C09K 8/42 | (2006.01) |
| C09K 8/035 | (2006.01) |
| C09K 8/565 | (2006.01) |
| C09K 8/575 | (2006.01) |

(52) U.S. Cl.
CPC .......... *E21B 33/138* (2013.01); *C08G 83/003* (2013.01); *C08G 83/004* (2013.01); *C09K 8/035* (2013.01); *C09K 8/42* (2013.01); *C09K 8/428* (2013.01); *C09K 8/44* (2013.01); *C09K 8/502* (2013.01); *C09K 8/508* (2013.01); *C09K 8/565* (2013.01); *C09K 8/5751* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 9,433,975 B2 * | 9/2016 | Chakraborty | B05D 1/02 |
| 2009/0090514 A1 * | 4/2009 | Bailey | C09K 8/508 166/381 |
| 2011/0265996 A1 * | 11/2011 | Lewis | C04B 28/02 166/292 |
| 2012/0267520 A1 * | 10/2012 | Roscoe | G01V 5/04 250/269.1 |
| 2013/0150267 A1 * | 6/2013 | Roddy | C04B 40/0641 507/103 |
| 2013/0312970 A1 * | 11/2013 | Lafitte | A61K 8/022 166/305.1 |
| 2013/0319667 A1 * | 12/2013 | Chen | C08F 301/00 166/280.1 |
| 2014/0060840 A1 * | 3/2014 | Hartshorne | C09K 8/685 166/300 |
| 2014/0224480 A1 * | 8/2014 | Nguyen | C09K 8/80 166/247 |
| 2014/0367092 A1 * | 12/2014 | Roberson | E21B 47/00 166/250.01 |

FOREIGN PATENT DOCUMENTS

GB  2490919 A  11/2012

OTHER PUBLICATIONS

International Search Report and Written Opinion issued in International Application No. PCT/EP2016/077605; dated Mar. 13, 2017 (14 pages).
Ping et al., "Adhesive curing through low-voltage activation", Nature Communications, vol. 6, Aug. 18, 2015, XP055350877 (9 pages).

* cited by examiner

*Primary Examiner* — Anuradha Ahuja
(74) *Attorney, Agent, or Firm* — Osha Liang LLP

(57) ABSTRACT

A wellbore strengthening composition may include a base fluid and at least one polymer functionalized with electrochemically activated groups. A method of treating a wellbore may include emplacing, in at least a selected region of the wellbore, a wellbore strengthening composition including a base fluid and at least one polymer functionalized with electrochemically activated groups. The method may also include emplacing a downhole tool capable of generating a voltage potential in the wellbore and applying a voltage potential in the wellbore with the downhole tool.

9 Claims, No Drawings

ELECTRICALLY ACTIVATED ADHESIVE FOR STRENGTHENING OF A SUBTERRANEAN WELLBORE

CROSS REFERENCE TO RELATED APPLICATIONS

This application claims the benefit of U.S. Provisional Application No. 62/255,001 filed on Nov. 13, 2015, incorporated by reference herein in its entirety.

BACKGROUND

Oilfield drilling occurs in geological formations having various compositions, permeabilities, porosities, pore fluids, and internal pressures. Weak zones may occur in a formation during drilling due to the formation having a variety of these conditions therein. These weak zones may lead to fluid loss, pressure changes, well cave-iris, etc. The formation of weak zones is detrimental to drilling because they need to be strengthened before drilling work may resume.

Weak zones may occur, for example, when the fracture initiation pressure of one formation is lower than the internal pore pressure of another formation. As another example, increased borehole pressure, created by penetrating one formation, may cause a lower strength formation to fracture. As another example, the fluid pressure gradient in a borehole required to contain formation pore pressure during drilling may exceed the fracture pressure of a weaker formation exposed in a borehole, Generally, weak zones have been strengthened by pumping a fluid into the weak. zone, letting the fluid cure and develop strength over a period of time. Fluids used in the past include cement, epoxy resins with amine initiators and vinyl toluenes with initiators. The cure time for cement may be as long as 24 hours, delaying oil production which is undesirable, especially for off-shore drilling with high operating costs. Cement's particle based structure may also exhibit poor penetration capabilities in the formation leading to a reduced sealing effect. When using epoxy resins or vinyl toluenes, the cure time may be reduced, but the compositions are toxic, highly corrosive, flammable and pose a health hazard.

Cement, or other fluid compositions used for strengthening weak zones, may also be used in primary cementing operations which fill at least a portion of the annular space between the casing and the formation wall with the fluid. The cement may then be allowed to solidify in the annular space, thereby forming an annular sheath of cement. The cement barrier is desirably impermeable, such that it will prevent the migration of fluid between zones or formations previously penetrated by the wellbore.

Generally, the cement or other strengthening composition is mixed at the surface and pumped downhole at high pressure to fill in the weak zone. Once the composition fills in the weak zones, it is allowed to set or cure, harden within the wellbore over a period of time.

DETAILED DESCRIPTION

Embodiments disclosed herein relate to chemical curing adhesives and their use in wellbore operations. Specifically, embodiments disclosed herein relate to curing of materials downhole by electrochemical means.

Chemical-curing adhesives (CCA) are adhesives that contain components that polymerize in response to an external or internal stimuli and may be used in wellbore strengthening compositions. Common or conventional curing methodologies for CCAs include those that are activated by either temperature, light, or an internal catalyst. Despite the theoretical control over the curing process of wellbore strengthening compositions containing conventionally activated CCAs, there are many issues in actual practice that limit their effectiveness. For example, the cure time may occur over an extended time period (several hours or more) serving to delay production of the well while also making it difficult to control exactly where the wellbore strengthening composition cures in the wellbore. The uncertainty in the curing location may lead to over application of the wellbore strengthening composition to ensure satisfactory strengthening of the wellbore.

Embodiments disclosed herein generally relate to the use of wellbore strengthening compositions in downhole applications. Other embodiments of the disclosure relate to methods for producing wellbore strengthening compositions. In the following description, numerous details are set forth to provide an understanding of the present disclosure. However, it will be understood by those skilled in the art that the present invention may be practiced without these details and that numerous variations or modifications from the described embodiments may be possible, In one or more embodiments, the curing of the wellbore strengthening composition in the wellbore may be triggered by an electrochemical input downhole. That is, the wellbore strengthening composition may be emplaced downhole and not cure/crosslink until an electrochemical input downhole. More specifically, some embodiments disclosed herein generally relate to wellbore strengthening compositions capable of electrochemically mediated curing downhole, Electrochemically mediated curing may be described as an on-demand type of curing that occurs when an applied voltage potential increases above a threshold level specific to certain electrochemically activated functional groups present on a polymer backbone, causing the functional groups to switch into an active state, thereby curing by crosslinking the polymer backbone and also potentially attaching to a substrate that the cured composition is to be adhered to. Upon lowering the applied voltage potential below said threshold, the crosslinking/curing may be arrested, allowing an operator a certain level of control over the degree of curing. Significantly, the degree of control offered by the electrochemically mediated curing of wellbore strengthening compositions may allow for site specific curing, control of the substrate bonding strength, and control over the properties of the cured material.

In one or more embodiments, the polymer used may be selected from at least one of a dendrimer, a star polymer, a graft polymer, or otherwise branched polymers. These branched polymers may be desirable over linear polymers because they are more likely to promote intermolecular crosslinks, rather than intramolecular crosslinks. In more particular embodiments, the polymer used may be a poly (amidoamine) (PAMAM) dendrimer. Like other dendrimers, PAMAM dendrimers have a sphere-like morphology resulting from the outward growth of dendrimers in a branching fashion starting from a core "initiator" molecule where each added outer layer, or generation, contains exponentially more branching points. The growth habit of dendrimers leads to a high degree of outer surface sites/branching points per volume of the dendrimer. In one or more embodiments, the dendrimer may have at least three generations, or at least five generations of growth, to endow its surface with a significant amount of outer surface sites/branch points. These surface sites/branch points may be functionalized with moieties that can be electrochemically activated via an applied voltage potential in order to initiate a curing process. During the curing process, the electrochemically activated groups on the surface of a dendrimer molecule chemically, and irreversibly, crosslink via covalent bonding with analogous groups on the surface of a plurality of other dendrimer molecules. A similar mechanism may also serve to cure correspondingly functionalized star polymers, graft polymers, or otherwise branched polymers.

In one or more embodiments, the electrochemically activated groups functionalized onto the dendrimer, star polymer, graft polymer, or otherwise branched polymer may include a carbene precursor. That is, electrochemical activation of a representative carbene precursor functional group on a polymer renders a species with at least a neutral carbon with a valence of two shared and two unshared electrons (i.e., a carbene). In one or more embodiments, the carbene precursor may be at least diazirine group. A diazirine group includes a carbon bound to two nitrogen atoms, which are double-bonded to each other, forming a cyclopropene-like ring. In addition to being bound to the nitrogen atoms, the carbon atom of the diazirine is also bonded to two substituents, $R_1$ and $R_2$, which may be chosen independently from $CF_3$, aryl, or substituted aryl groups. In embodiments using diazirine groups with $R_1/R_2$ as substituted aryl groups, the substitution may be at least one selected from halogens, $C_1$-$C_6$ carbon chains, or ester containing species. In one or more embodiments, the voltage potential applied to form the carbene from the diazirine carbene precursor may be tuned by varying the chemical identity of the substituents ($R_1/R_2$) on the carbon atom. In more specific embodiments, the carbene precursor may be an aryl diazirine, for example, 3-[4-(bromomethyl)phenyl]-3-(trifluoromethyl)-diazirine.

The polymer functionalized with electrochemically activated groups may be mixed with a base fluid to create a wellbore strengthening composition. In one or more embodiments, the base fluid may include an aqueous fluid, an oleaginous fluid, or combinations thereof, such as an emulsion, (direct emulsion or invert emulsion). The polymer functionalized with electrochemically activated groups may be used in an amount ranging from about 10 to about 90 weight percent, based on the total weight of the wellbore strengthening composition, from about 20 to about 80 weight percent in other embodiments, and from about 30 to about 70 weight percent in yet other embodiments.

Additives

Additives are widely used in polymeric composites to tailor the physical properties of the resultant cured composition. In some embodiments, additives may include plasticizers, thermal and light stabilizers, flame-retardants, fillers, adhesion promoters, or rheological additives.

Addition of plasticizers may reduce the modulus of the polymer at the use temperature by lowering its glass transition temperature (Tg). This may allow control of the viscosity and mechanical properties of the cured composition. In some embodiments, the plasticizer may include phthalates, epoxides, aliphatic diesters, phosphates, sulfonamides, glycols, polyethers, trimellitates or chlorinated paraffin. In some embodiments, the plasticizer may be a diisooctyl phthalate, epoxidized soybean oil, di-2-ethylhexyl adipate, tricresyl phosphate, or trioctyl trimellitate.

Fillers are usually inert materials which may reinforce the cured composition or serve as an extender. Fillers therefore affect the polymer processing, storage, and curing. Fillers may also affect the properties of the cured composition such as electrical and heat insulating properties, modulus, tensile or tear strength, abrasion resistance and fatigue strength. In some embodiments, the fillers may include carbonates, metal oxides, clays, silicas, mica, metal sulfates, metal chromates, or carbon black. In some embodiments, the filler may include titanium dioxide, calcium carbonate, non-acidic clays, barium sulfate or fumed silica. The particle size of the tiller may be engineered to optimize particle packing, providing a composite having reduced resin content, The engineered particle size may be a combination of fine, medium and coarse particles. The particle size may range from about 3 to about 74 microns.

Addition of adhesion promoters may improve adhesion of the cured composition to various substrates. In some embodiments, adhesion promoters may include modified phenolic resins, modified hydrocarbon resins, polysiloxanes, silanes, or primers.

Addition of theological additives may control the flow behavior of the wellbore strengthening composition. In some embodiments, rheological additives may include fine particle size fillers, organic agents, or combinations of both. In some embodiments, theological additives may include precipitated calcium carbonates, non-acidic clays, fumed silicas, or modified castor oils.

The wellbore strengthening composition may also contain other common wellbore treatment fluid ingredients such as fluid loss control additives, dyes, anti-foaming agents, weighting agents, bridging agents, wetting agents, thinners, emulsifiers, surfactants, buffers, viscosifiers, gelling agents, solvents, and the like, employed in typical quantities, known to those skilled in the art. Of course, the addition of such other additives should be avoided if it will detrimentally affect the basic desired properties of the treatment fluid.

Downhole Implementation

In one or more embodiments, a wellbore fluid containing a strengthening composition with at least some polymer functionalized with electrochemically activated groups, as outlined above, may be pumped downhole and used in a variety of applications such as wellbore strengthening, stabilizing wellbore casings, zonal isolations, sealing applications, replacement for well cements, cement squeezes, combatting thief zones in enhanced oil recovery, and well abandonment. Thus, a fluid of the present disclosure may be pumped into a selected region of the wellbore needing consolidation, strengthening, fluid loss reduction, etc., and cure may be initiated through electrochemical means.

A downhole tool having the ability to generate a sufficient applied voltage potential to electrochemically activate the polymer and induce its crosslinking/curing may then be placed downhole, if not already emplaced, and used to selectively crosslink/cure the polymer containing strengthening composition to form a strongly bonded matrix that may efficiently coat the loosely consolidated formation. Such a strongly bonded matrix may effectively retain the loosely consolidated formation, for example, controlling the production of sand grains from the treated zones. This treatment may serve to strengthen the wellbore and reduce debris which may cause wear to downhole tools.

In some embodiments, the movement of the downhole tool may be used to push or place the wellbore fluid containing the strengthening composition to a certain location in the wellbore prior to the downhole tool selectively crosslinking/curing the composition. In one or more embodiments, multiple locations or zones within the same wellbore may be selectively cured/crosslinked through the use of the downhole tool selectively applying the voltage potential at multiple locations or zones. Further, the downhole tool may be configured to selectively apply the voltage potential only to the wellbore near the wall area, resulting in curing/crosslinking that is localized at the wellbore wall, without curing/crosslinking the polymer in a radially interior portion of the wellbore. This contrasts with the curing/crosslinking that commonly occurs throughout the bulk of the wellbore (i.e., the entire or substantially the entire cross-sectional area of the wellbore) when conventional CCAs are used. It is also envisioned that the fluid may traverse into a formation (e.g., a loosely consolidated formation) prior to electrochemically activating the curing/crosslinking so that the fluid is crosslinked entirely within the near wellbore region of the formation or in the near-wellbore region of the formation in combination with a near-formation region of the wellbore.

hi one or more embodiments, the voltage potential applied by the downhole tool may be at least about −0.5V, −1V, −1.5V, −2.0V, or −2.5V. Further, the duration of the application of the voltage potential by the downhole tool in a particular location may be modulated to cure/crosslink the wellbore strengthening composition to different degrees. For example, highly crosslinked/cured polymers are often hard and brittle, making them prone to breaking or otherwise failing under the variable stresses experienced downhole (e.g., pressure, temperature, etc.). Thus, the duration of the application of the voltage potential may be used to selectively achieve a crosslinking/curing degree for the wellbore strengthening composition that provides optimal mechanical properties (e.g., modulus, strength, and strain, toughness, etc.) for the wellbore zone to be strengthened. In general, the longer the duration of the application of the voltage potential the more cured/crosslinked the wellbore strengthening composition will become.

In one or more embodiments, the wellbore fluids of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading." It is also envisioned that the fluid may be used in larger quantities than a pill, such as in drilling, completions, cementing, etc.

In one or more embodiments, the fluids may be introduced into a wellbore drilled to completely or partially displace any type of initial drilling fluid and, in particular embodiments, fluids may be used to displace an oil-based, water-in-oil, oil-in-water, or aqueous-based drilling fluid directly, without intermediate steps using a displacement fluid, cleaning fluid, and/or spacer fluid. In one or more embodiments, the fluids of the present disclosure may be added to a well, topping off the well, or added to a previously emplaced fluid without intermediate steps.

In one or more embodiments, compositions disclosed herein may be used as a replacement for wellbore cements and used in any cementing application known in the art including, but not limited to, primary cementing, zonal isolation, cement squeezes, fluid loss pills, and the like. When used as a cement replacement (or used in conjunction with cement) in primary cementing operations, compositions of the present disclosure may be placed in at least a portion of an annular space between sidewalls of a wellbore and the exterior of a casing string disposed in the wellbore. The composition may then be electrochemically activated and allowed to cure/solidify therein. The compositions may be placed in the annular space either before or after a wellbore fluid is placed in the annular space. In such embodiments, the polymer-forming composition may be mixed with the wellbore fluid (at least to some extent) and the composition may still cure despite dilution by the wellbore fluid. In some embodiments, a wellbore or annular space within the wellbore may be preflushed or overflushed with an oleaginous wellbore fluid or an aqueous wellbore fluid such as water, seawater, or brine prior to or following emplacement of a composition of the present disclosure, and the composition of the present disclosure may be added directly thereto.

In some embodiments, a composition may be pumped into a selected region of the wellbore (such as an open-hole or cased wellbore) needing consolidation, strengthening, fluid-loss reduction, etc., and following electrochemical activated curing, drilling may continue (drilling out a portion of the formed polymer mass to the extent the cured region extends into a central region of the bore. For example, when loss of a wellbore fluid is being experienced from the formation, the polymer-forming composition of the present disclosure may be emplaced (such as by bullheading) directly into the region of the well experiencing losses and allowed to mix with the drilling fluids and cure.

In other embodiments, composition as described herein may be injected into the formation as diverting agents to combat the thief zones or high permeability zones of a formation. The composition injected into the formation may react and partially or wholly restrict flow through the highly conductive zones. In this manner, a generated polymeric mass may effectively reduce channeling routes through the formation and increasing the contact of subsequent fluid treatments with less porous zones of the formation, potentially decreasing the volume of fluid treatments required and increasing the oil recovery from the reservoir. Moreover, compositions may also be employed in the abandonment of wellbores at any operational stage of the well formation or subsequent to cessation of production.

As another example, embodiments of the compositions disclosed herein may be used as a loss circulation material (LCM) treatment when excessive seepage or circulation loss problems are encountered. In such an instance, the formulations may be emplaced into the wellbore into the region where excessive fluid loss is occurring and curing may be electrochemically initiated. Upon setting, drilling of the wellbore to total depth may be continued.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:
1. A method of treating a wellbore, the method comprising:
emplacing in at least a selected region of the wellbore, a wellbore strengthening composition comprising:
a base fluid; and
at least one polymer functionalized with electrochemically activated groups;
emplacing a downhole tool capable of generating a voltage potential in the wellbore; and applying a voltage potential in the wellbore with the downhole tool.

2. The method of claim 1, wherein the voltage potential is applied near a wall of the wellbore.

3. The method of claim 1, wherein the voltage potential is applied at multiple distinct zones of the wellbore.

4. The method of claim 1, wherein the voltage potential applied is at least about −0.5V.

5. The method of claim 1, wherein the voltage potential is applied for at least one minute.

6. The method of claim 1, wherein the voltage potential is applied for at most one hour.

7. The method of claim 1, wherein the at least one polymer functionalized with electrochemically activated groups is a dendrimer.

8. The method of claim 1, wherein the at least one polymer functionalized with electrochemically activated groups is a poly(amidoamine) dendrimer.

9. The method of claim 1, wherein the electrochemically activated groups are carbene precursors.

* * * * *